March 23, 1965   R. SCHWING ETAL   3,174,759
SEAL SEAT BACKING FOR MECHANICAL SEALS
Filed Sept. 25, 1961
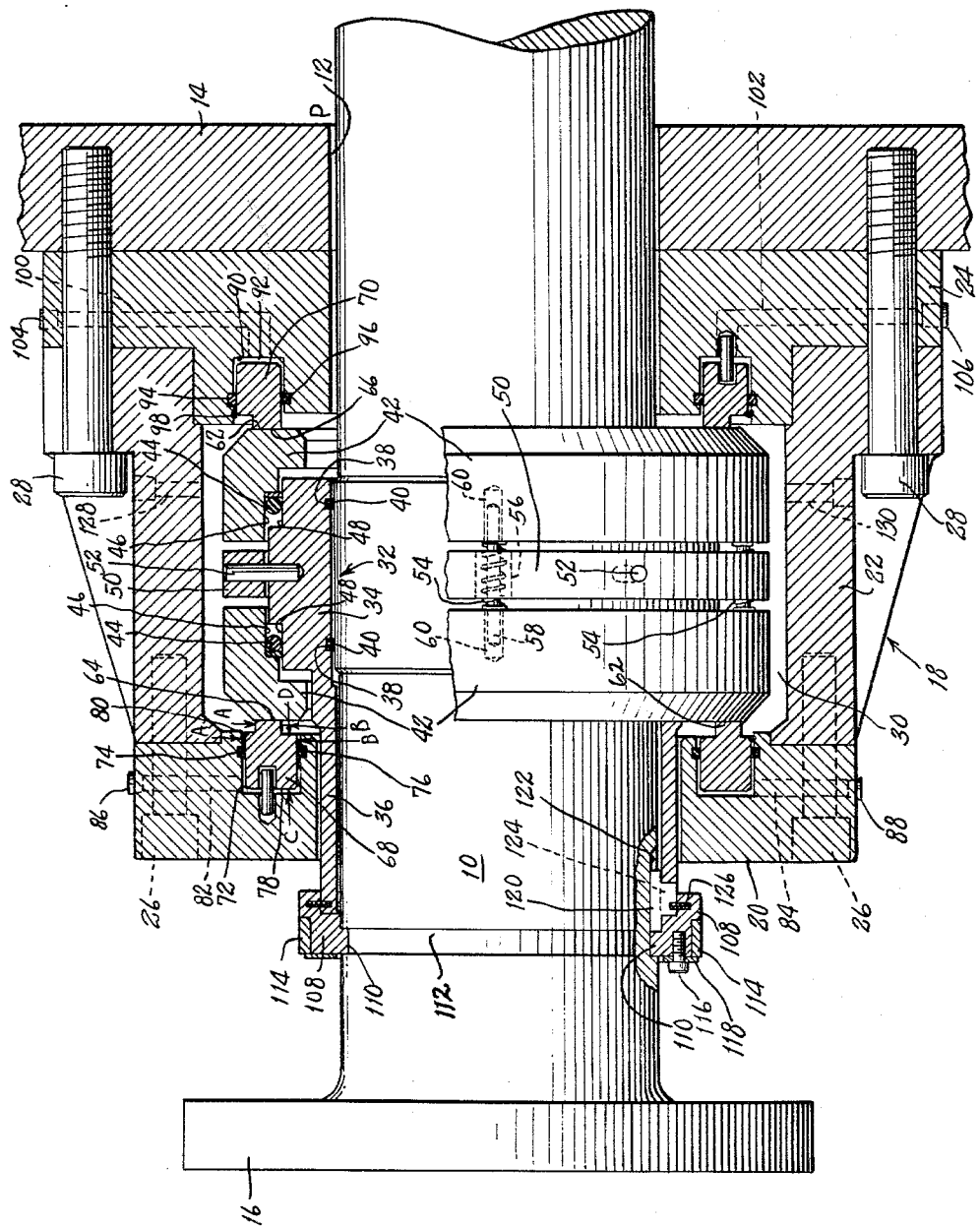
INVENTORS:
ROGER SCHWING
OTTO E. HOSFORD
BY Robert Henderson
ATTORNEY United States Patent Office 3,174,759
Patented Mar. 23, 1965

3,174,759
SEAL SEAT BACKING FOR MECHANICAL SEALS
Roger Schwing and Otto E. Hosford, both of Palmyra, N.Y., assignors to Garlock Inc., Palmyra, N.Y., a corporation of New York
Filed Sept. 25, 1961, Ser. No. 140,425
4 Claims. (Cl. 277—73)

This invention relates generally to mechanical seals wherein an annular, radial face of a rotary sealing ring, sealed to and turning with a rotary machine element such as a shaft, effects a sliding seal with an opposed annular, radial face of a stationary sealing ring or seal seat which is sealed to a stationary machine element such as a casing through which the shaft extends.

More particularly, this invention relates to improved means for backing or supporting such a stationary seal seat in the stationary machine element.

It has been common practice to provide, in back of such seal seats, a supporting ring of yieldable, solid material such as rubber or a relatively rubber-like composition. Such an arrangement has been satisfactory under some conditions as, for example, where pressures imposed upon the seal seat are relatively low. The present invention is useful in seals subjected to the just-stated conditions, but it is particularly useful in seals which are subjected to relatively high pressure conditions; and the present disclosure, therefore, is made with special reference to seals subjected to high pressure conditions.

Where a supporting ring of solid, rubber-like material is employed, its response to substantial axial force imposed upon the related seal seat is to become compressed very considerably, to or substantially to its limit of compressibility. In that situation, it can yield little, if at all, to enable the seal seat to vibrate or wobble in unison with the rotary sealing ring which usually vibrates or wobbles to some extent in operation. As a result, the two sliding sealing surfaces of the rotary sealing ring and the stationary seal seat do not maintain such close intimacy as to yield as good a sealing effect as is desired.

Some recognition has heretofore been given to the idea of using fluid as a backing or supporting medium for such seal seats but the arrangement has been such that the backing fluid has been in constant communication with (i.e. has been a part of) fluid employed for sealing purposes. That arrangement, however, has occasioned considerable difficulty in adapting a given seal to operate under widely varying pressure conditions.

Accordingly, an important object of this invention is the provision of an improved seal seat arrangement which permits the use of an isolated body of fluid as a support or backing for such a seal seat, to permit the seat to vibrate or wobble with a related rotary sealing ring while minimizing or avoiding the mentioned difficulty and other difficulties encountered in using the sealing fluid for sealseat supporting purposes.

Another important object is the provision of a seal-seat arrangement wherein fluid pressure which supports the seal seat opposes other fluid pressures which tend to distort and weaken the seat.

The foregoing and other objects are achieved by the present invention of which preferred forms are illustrated in the accompanying drawing without, however, limiting the invention to those particular forms.

The drawing is a view, mostly in central axial section, but with some parts shown in elevation, of a mechanical seal, including seal seat and seat backing means according to this invention; said seal being shown in operational association with a portion of a machine casing and a rotary shaft extending through an opening in said casing.

In the arrangement illustrated in the drawing, the shaft 10 extends through an opening 12 of a machine casing wall 14 which is only fragmentally shown. The outer end of the shaft is shown with a flange 16 by which it may be connected to a shaft of a motor (not shown). The inner end of the shaft amy have some working device thereon, as for example, an agitator or a gear of a gearset (not shown).

The seal comprises a housing 18 formed of an outer end wall 20, a cylindrical wall 22, and an inner end wall 24, all bolted together by bolts 26 and 28 of which the latter bolts also serve to secure the housing to the wall 14 of the machine casing. The walls 14, 20 and 24 are centrally apertured to accommodate the shaft, and suitable gaskets (not shown) are provided between the several mentioned parts of the housing and between the latter and the casing wall 14. With certain other parts, hereinafter detailed, these enumerated parts constitute the stationary parts of the seal.

Rotary parts of the seal are carried upon and constrained to turn with the shaft 10 and, for the most part, are disposed within the housing 18, in a sealing area 30 defined by said housing. The rotary parts include a sleeve 32, closely surrounding the shaft 10, having a main or body portion 34 from which an integral neck 36 extends outwardly to the exterior of the housing 18 to serve, as hereinafter explained, as a means for retaining said sleeve in a desired position on the shaft and to constrain it to turn with the shaft.

Within inner annular grooves 38 in the sleeve 32, rubber O rings 40 serve to seal said sleeve with respect to the shaft to prevent fluid leakage along the latter. Two similar, or somewhat similar, oppositely facing, rotary sealing rings 42 extend closely about the body portion 34 of the sleeve, and the rubber O rings 44 serve as seals between the rings 42 and said sleeve. The O rings 44 are disposed within opposed annular rabbets 46 and 48 in the sealing rings 42 and in the sleeve 32 to provide seals between said sealing rings and sleeve, while permitting relative axial movement therebetween.

Disposed between the rotary sealing rings 42 and closely encircling the sleeve's body portion 34 is a spring retaining and drive ring 50 which is pinned to the sleeve 32 by pins 52 and thereby constrained to turn with said sleeve. Coil springs 54, disposed within axial bores 56 (only one being shown) in the ring 50, are compressed between the rotary sealing rings 42 to urge the latter oppositely from each other; and driving pins 58, extending within said springs and into bores 60 in the two rotary sealing rings 42 constrain the latter to turn with the sleeve 32 and, hence, with the shaft 10.

Sealing faces 62 of the rotary rings 42 effect sliding sealing engagement with sealing faces 64 and 66 of stationary seal rings or seats 68 and 70 which are supported in the walls 20 and 24.

The seal seat 68 is disposed loosely within an axially facing, annular channel 72 in wall 20, and rubber O rings 74 and 76 effect seals of outer and inner cylindrical surfaces of the seal seat 68 with adjacent cylindrical walls of said channel, thereby providing a fluid-pressure chamber 78 which surrounds the back or outer part of the seat 68. A snap ring 80 seated in a suitable circular groove in the wall 20 abuts the seat 68 to retain the latter in said channel.

As thus far described, the seat 68 is capable of limited axial movement and canting movement, within the channel 72. Fluid inlet and outlet ports 82 and 84 serve as means for introducing fluid into and/or evacuating fluid from the chamber 78, said ports being provided with screw plugs 86 and 88.

The seal seat 70 is similarly disposed in a channel 90, in wall 24, defining a fluid-pressure chamber 92. O rings 94 and 96, snap ring 98, ports 100 and 102 and plugs 104 and 106 are provided in association with the channel 90, similar to like-named parts associated with the channel 72.

It is desirable that the sleeve 32 be fixedly located in such an axial position on the shaft 10 that the sleeve's main or body portion 34 is approximately midway between the seal's walls 20 and 24. Such fixation of the sleeve is accomplished by a segmental thrust ring 108 which, in part, overlies and is connected by a snap ring 126 to the outer end of the sleeve's neck 36 and has an inner radial flange 110 which seats within an annular groove 112, formed in the shaft, to hold the thrust ring and, hence, the sleeve 32, against movement axially of the shaft.

A retainer ring 114, closely encircling the thrust ring 108, is held in place thereon by one or more screws 116, each having an associated washer 118 overlying the outer end of the retainer ring. A key 120, disposed in a keyway 122 in the shaft and extending into a suitable slot 124 in the end of the sleeve's neck 36, serves to constrain the sleeve 32 to turn with the shaft.

In preparation for operation of the seal, the chambers 78 and 92 are supplied with fluid, preferably liquid, through ports 82, 100 and/or 84, 102 to an extent sufficient to hold the stationary seal rings or seats 68 and 70 substantially clear of the flat bottom surfaces defining the channels 72 and 90, whereafter said ports are closed by insertion of their related plugs. It will be realized that each of said chambers may be provided with only one fluid-supply port; also, that instead of closing off said ports, they may be suitably connected through ducts (not shown) to a source of fluid supply which, by means of a related accumulator (not shown) or equivalent means, is adapted to maintain an adequate supply of fluid in said chambers.

In operation, sealing liquid is supplied to the sealing area 30 and maintained at a relatively high pressure therein, perferably somewhat higher than the pressure of the fluid to be sealed within the machine casing as indicated at P. For this purpose, inlet and outlet ports 128 and 130 are provided in cylindrical wall 22 and are suitably connected to means (not shown) for supplying and circulating sealing fluid with respect to the sealing area 30 and for maintaining the desired high pressure therein. Cooling means may also be associated with said fluid-supplying and circulating means to carry off heat which the sealing fluid receives from various parts of the seal.

It will be understood that, in the illustrated arrangement, the pressure of the sealing fluid in the sealing area 30 exerts substantial forces upon the rotary seal rings 42, urging them away from each other to maintain them in sliding sealing engagement with the fluid-backed stationary sealing rings or seats 68 and 70 to prevent material leakage of the sealed fluid P past the axially innermost one of the rotary rings 42.

It should be noted that, with the improved seal seat arrangement according to this invention, the stationary sealing rings or seats are backed up by a closed or static body of fluid. Thus, in engagement with the rotary rings 42, the seats 68 and 70 float against the fluid in the chambers 78 and 92 and adjust themselves instantaneously to vibrations, slight canting, or other irregular movement of the rotary rings 42 during operation. The static body of backing fluid permits such coordinated action between the said rotary rings and seal seats much more effectively than seal seat backings hitherto provided and, as a result, affords an improved sealing effect at the sealing faces 62, 64 and 62, 66.

The fluid backing of the stationary seal seat, according to this invention, also provides better seal-seat support than prior arrangements because its affords support at the entire back end and at substantial inner and outer peripheral areas of the seal seat, while prior backing or supporting means have commonly been rubber rings disposed at the back of the seal seat and at one or the other but not both peripheries thereof. The support, afforded over greater areas of the seal seat by this invention, gives greater assurance against distortion of the seal seat which commonly is of a carbon composition not well adapted to resist distortion-inducing forces.

The described fluid-backing support and the characteristics of the front end of the seal seat may be correlated, within this invention, to eliminate or minimize distortion and failure of the seal seat by high fluid pressure imposed upon the front end thereof. To illustrate this, reference is made to the seal seat 68, the inner or front end of which is subjected to the high fluid pressure in sealing area 30 at the outer side of said seat's sealing face 64 while being subjected only to atmospheric pressure at the inner side of said sealing face. Except for an arrangement, according to this invention, the just-stated imbalance of pressure would severely strain the seal seat.

Such strain is substantially canceled out by a seal seat such as seat 68. The sectional showing of that seat in the drawing is illustrative of said seal seat at an infinite number of circumferential points therearound, all subject to similar stresses. Realizing the susceptibility of the ring 68 to the distortion, it would appear, upon only casual consideration, that the high fluid pressure in sealing area 30, effective radially inwardly at points A, A, and greatly overbalancing atmospheric pressure effective radially outwardly at points B, B, would tend strongly to twist the ring 68 or, i.e., tend to turn it clockwisely about the center point of the ring's illustrated section, and thereby distort said ring.

The just-mentioned undesirable effect is avoided, however, by the illustrated arrangement of said ring according to one form of this invention, wherein the pressure of the fluid in chamber 78, where operative against an inner annular surface of the outer or back end of the ring 68 at point C, is subjected to no material opposition from the atmospheric pressure at point D at the inner or front end of said ring and tends to turn or twist the ring counterclockwisely about the center point of the illustrated section of said ring. Thus, the high pressure imposed on ring 68 at point C in the chamber 78 strongly opposes and substantially counteracts the high pressure imposed upon that ring at points A, A in the sealing area 30, thereby relieving said ring of all material tendency toward distortion.

The seal seat 70 is fluid-backed or supported, according to this invention, but, unlike seat 68, it is not designed to utilize the pressure of the backing fluid to oppose material distortion-inducing forces; this because, at both sides of the sliding sealing surfaces 62, 66, the relatively high and not greatly differing pressures of the sealing fluid and the sealed fluid oppose each other so that they do not induce any material distortion of the seat 70.

It may be noted from a comparison of the front ends of the seal rings or seats 68 and 70, that, where it is desired to utilize the pressure of the backing fluid to counteract the mentioned twisting or distorting forces imposed upon a seal seat, the sliding sealing face (for example, face 64 of ring 68), should terminate at its low pressure side at such a radial point as to provide a low pressure area such as at D so that the much higher pressure, effective at C, will exert the previously mentioned counteracting effect in opposition to the pressure at A, A.

The attainment of the stated objects of this invention may, of course, be realized from various seal seat designs and arrangements other than those disclosed herein for descriptive purposes. The present invention, therefore, is not to be considered as limited to the forms disclosed herein, but should be considered to be as broad as set forth in the following claims.

We claim:

1. In combination, a stationary machine casing, a rotary shaft extending into a shaft opening in said casing, a rigid seal seat ring disposed in an axially facing, cylindrical channel formed in said casing and extending about said shaft, means, in said channel, coacting with said ring to hold the latter against rotation, packing rings at the outer and inner peripheries of said seal seat ring effecting seals between the latter and opposed cylindrical surfaces of said casing defining said channel, thereby forming a pressure chamber in the bottom of said channel, a static body of fluid in said chamber, holding said seal seat ring against engagement with the bottom wall of said channel, duct means in said machine casing constituting sole means for introducing fluid into said chamber, closure means in said duct means continuously closing the latter against movement of fluid therethrough relatively to said chamber, a rotary sealing ring carried upon and sealed with respect to said shaft and constrained to turn therewith, and means urging said rotary sealing ring axially to bring an annular surface of the latter ring into sliding sealing engagement with an annular surface of said seal seat ring.

2. In a mechanical seal having a stationary seal seat ring adapted for sealed association with a machine casing wall adjacent to a shaft opening in the latter, a rotary sealing ring in sealed association with a shaft extending through said opening and constrained to rotate with said shaft, and yieldable means for urging said rotary ring axially into sliding sealing engagement with a front-facing surface of said stationary ring; means for supporting said stationary ring comprising a portion of said casing, formed with an annular channel extending about said opening and facing said rotary ring and in which channel said stationary ring is loosely disposed, packing means between said stationary ring and opposed cylindrical surfaces defining side walls of said channel, and a body of liquid, of constant volume, confined in a bottom portion of said channel and around side walls of said channel rearwardly of said packing means, holding said stationary ring clear of the channel's bottom wall whereby to support the stationary ring in opposition to rearwardly directed thrust imposed thereon at its forward end by said rotary sealing ring and to enable the stationary ring to adjust quickly to irregular movements of said rotary ring.

3. Ring-supporting means according to claim 2, in combination with a seal seat ring having a surface adjacent to its front end disposed to receive fluid pressure directed radially in one direction, tending to twist said ring in one direction, and said seal seat ring having an annular surface at its back end adapted to so react to pressure of said body of liquid as to tend to twist said ring oppositely to said first-mentioned twisting tendency.

4. Ring-supporting means according to claim 3 said seal seat ring having an annular sealing surface at its front end terminating, at one of its peripheries, at a cylindrical surface of said seat ring which may be subjected to relatively high fluid pressure giving rise to the first-mentioned twisting effect, and wherein said annular sealing surface terminates, at its other periphery, at a cylindrical surface of an annular rabbet which may be subjected to relatively low-fluid pressure; said annular surface at the back end of said seal seat ring being substantially in axial alignment with said rabbet whereby pressure of said body of liquid upon the last-mentioned annular surface preponderates the fluid pressure imposed upon the surfaces of said rabbet, thereby given rise to the second-mentioned twisting effect.

References Cited by the Examiner
UNITED STATES PATENTS

| | | | |
|---|---|---|---|
| 2,430,918 | 11/47 | Curry | 277—73 |
| 2,672,357 | 3/54 | Voytech | 277—73 |
| 2,723,868 | 11/55 | Hartranft | 277—81 X |
| 2,836,440 | 5/58 | Brumagim | 277— 81 X |
| 3,019,026 | 1/62 | Schwing | 277—71 X |
| 3,074,728 | 1/63 | Freed | 277—74 |

EDWARD V. BENHAM, *Primary Examiner.*

SAMUEL ROTHBERG, *Examiner.*